(12) United States Patent
Figi et al.

(10) Patent No.: US 10,094,691 B2
(45) Date of Patent: Oct. 9, 2018

(54) FLOW SENSOR ARRANGEMENT

(71) Applicant: Sensirion AG, Stafa (CH)

(72) Inventors: Harry Figi, Stafa (CH); Mark Hornung, Stafa (CH); Robert Wuest, Stafa (CH)

(73) Assignee: Sensirion AG, Stafa (CH)

( * ) Notice: Subject to any disclaimer, the term of this patent is extended or adjusted under 35 U.S.C. 154(b) by 115 days.

(21) Appl. No.: 14/976,799

(22) Filed: Dec. 21, 2015

(65) Prior Publication Data

US 2016/0216144 A1 Jul. 28, 2016

(30) Foreign Application Priority Data

Dec. 22, 2014 (EP) ..................... 14004363

(51) Int. Cl.
*G01F 1/688* (2006.01)
*G01F 15/02* (2006.01)

(52) U.S. Cl.
CPC .......... *G01F 1/6888* (2013.01); *G01F 15/022* (2013.01)

(58) Field of Classification Search
CPC ...... G01F 1/6888; G01F 1/6847; G01F 1/684; G01F 1/00; G01F 1/6842; G01F 15/022; E21B 47/1005; G01K 7/04
(Continued)

(56) References Cited

U.S. PATENT DOCUMENTS 3,042,786 A 7/1962 Babcock et al.
4,623,266 A 11/1986 Kielb
(Continued)

FOREIGN PATENT DOCUMENTS

EP 0943900 8/1999
EP 1065475 1/2001
(Continued)

OTHER PUBLICATIONS

C. Falco et al., "3D Modelliing of a Thermopile-based SOI CMOS Thermal Wall Shear Stress Sensor", pp. 277-280, 2014, IEEE.
(Continued)

*Primary Examiner* — Harshad R Patel
*Assistant Examiner* — Nigel Plumb
(74) *Attorney, Agent, or Firm* — Cooper & Dunham LLP

(57) ABSTRACT

A flow sensor arrangement for determining the flow of a fluid comprises a substrate. A heater is arranged in or on the substrate as well as at least one first thermocouple for generating a first signal proportional to a temperature difference between a location downstream from the heater and a first reference location, and at least one second thermocouple for generating a second signal proportional to a temperature difference between a location upstream from the heater and a second reference location which second reference location is different from the first reference location. In addition, at least one third thermocouple is arranged in or on the substrate for generating a third signal proportional to a temperature difference between the first reference location and the second reference location. Means are provided for determining a sensing signal indicative of the flow of the fluid over the heater and the first and the second thermocouple dependent on the first signal, the second signal and the third signal.

20 Claims, 3 Drawing Sheets

(58) Field of Classification Search
USPC ...... 73/204.24, 204.23, 204.11, 861, 152.33, 73/202.5; 374/179
See application file for complete search history.

(56) References Cited

U.S. PATENT DOCUMENTS

| | | | |
|---|---|---|---|
| 4,651,564 A | 3/1987 | Johnson et al. | |
| 4,672,997 A | 6/1987 | Landis et al. | |
| 5,288,147 A * | 2/1994 | Schaefer | G01K 17/00 136/225 |
| 5,596,219 A | 1/1997 | Hierold | |
| 5,830,372 A | 11/1998 | Hierold | |
| 6,662,121 B1 | 12/2003 | Oda et al. | |
| 6,681,742 B1 | 1/2004 | Hirayama et al. | |
| 6,684,694 B2 | 2/2004 | Fujiwara et al. | |
| 6,752,014 B1 | 6/2004 | Kanke et al. | |
| 6,871,538 B2 * | 3/2005 | Fujiwara | G01F 1/6965 73/204.26 |
| 7,234,864 B2 | 6/2007 | Streicher | |
| 7,490,511 B2 | 2/2009 | Mayer et al. | |
| 7,644,613 B2 | 1/2010 | Mayer et al. | |
| 8,011,240 B2 * | 9/2011 | von Waldkirch | G01F 1/6845 219/201 |
| 2002/0007674 A1 | 1/2002 | Leung | |
| 2002/0043104 A1 | 4/2002 | Lammerink | |
| 2003/0115952 A1 | 6/2003 | Mayer et al. | |
| 2003/0152128 A1 | 8/2003 | Verhaegen | |
| 2004/0163464 A1 | 8/2004 | Nakada et al. | |
| 2006/0144138 A1 | 7/2006 | Yamada et al. | |
| 2010/0268475 A1 | 10/2010 | Kusumoto | |
| 2010/0307916 A1 | 12/2010 | Ramey et al. | |
| 2011/0119018 A1 | 5/2011 | Skarp | |
| 2011/0307208 A1 | 12/2011 | Graf et al. | |
| 2012/0065923 A1 | 3/2012 | Whitely | |

FOREIGN PATENT DOCUMENTS

| | | |
|---|---|---|
| EP | 1477781 | 6/2010 |
| EP | 2682715 | 1/2014 |
| EP | 2808650 | 12/2014 |
| JP | 2000304584 | 11/2000 |
| JP | 2002048615 | 2/2002 |
| KR | 100931702 | 12/2009 |
| WO | 2013045897 | 4/2013 |

OTHER PUBLICATIONS

A. De Luca et al., "A Thermopile Based SOI CMOS MEMS Wall Shear Stress Sensor", pp. 59-62, 2013, IEEE.
L.J. Huang et al., "MEMS Thermal Mass Flow Meters for Humidified Gases", Siargo Ltd., 5 pages.
gSKIN Heat Flux Sensor, greenTEG AG, 1 Page.
P. Malcovati et al., Combined Air Humidity and Flow CMOS Microsensor with On-Clip 15 Bit Sigma-Delta A/D Interface, 1995 Symposium on VLSI Circuits Digest of Technical Paper, XP000557797.

* cited by examiner

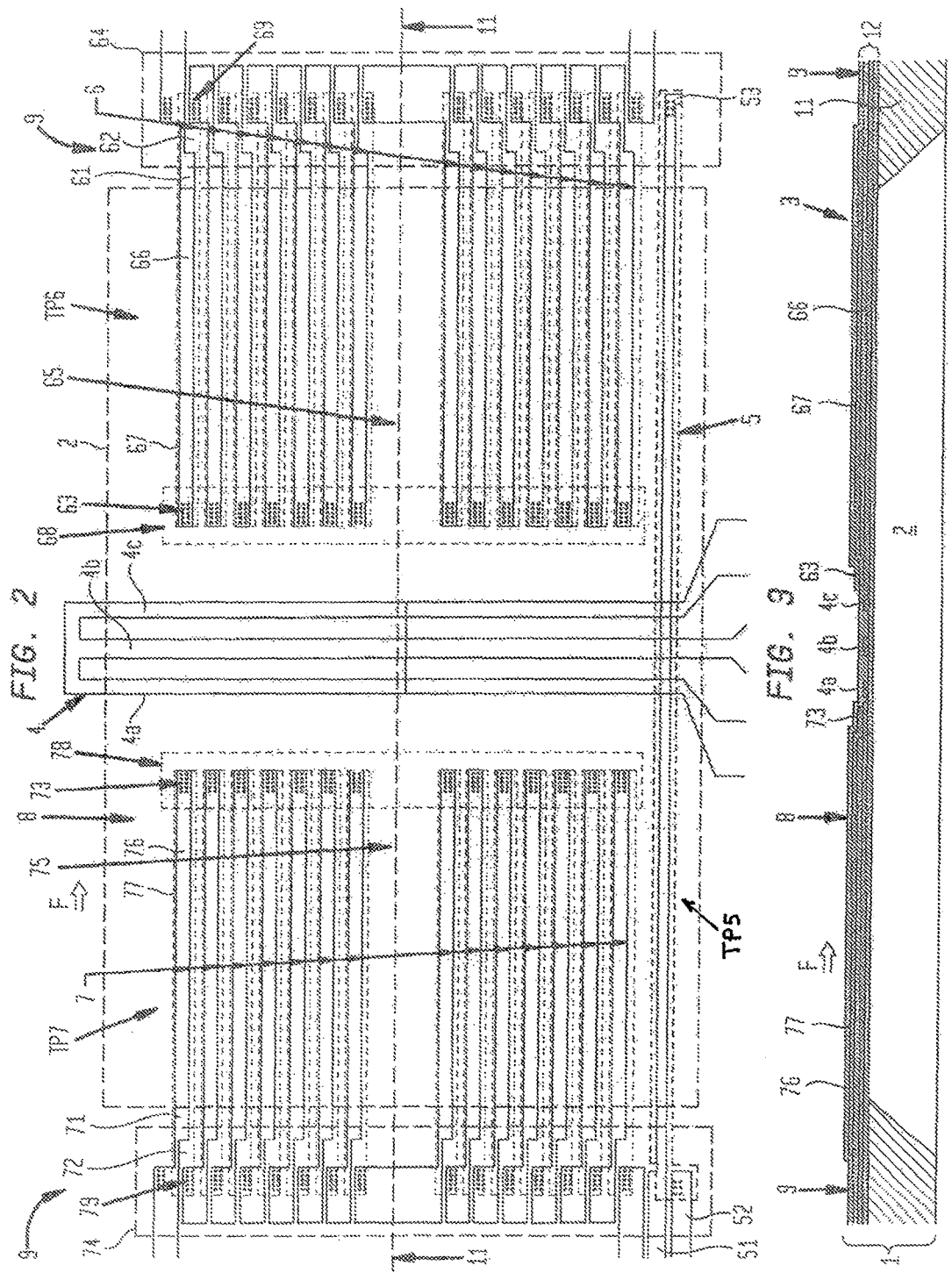

FLOW SENSOR ARRANGEMENT

CROSS-REFERENCE TO PRIOR APPLICATIONS

This application claims priority to European Patent Application No. 14 004 363.9, filed on Dec. 22, 2014, which is hereby incorporated by reference herein in its entirety.

TECHNICAL FIELD

The invention relates to a flow sensor arrangement, and to a method for determining the flow of a fluid.

BACKGROUND ART

Commonly used calorimetric flow sensors feature a heat source in form of a heater and spatially separated temperature sensors embedded in a thin membrane. The temperature sensors typically located upstream and downstream of the heater measure the amount of heat that is carried away by the fluid in a direct or indirect way. A thermocouple may be used as temperature sensor which thermocouple is made from two dissimilar materials which are joined at at least one junction. The junction is located on the membrane whose temperature condition is to be measured. This junction is also referred to as hot junction. Terminals of the thermocouple, or further junctions/cold junctions when connecting to other thermocouples are maintained at a constant temperature of the bulk material surrounding the membrane, for example. A difference in potential is created whenever there is a difference in temperature between the hot junction of the respective thermocouple and the corresponding cold junction, resulting in an easily measurable thermoelectric voltage. The difference between the up- and downstream thermoelectric voltage can be used as a measure for a velocity of the fluid.

DISCLOSURE OF THE INVENTION

According to a first aspect of the present invention, a flow sensor arrangement is provided for determining the flow of a fluid. The flow sensor arrangement comprises a substrate. A heater is arranged on or in the substrate as well as at least one first thermocouple for generating a first signal proportional to a temperature difference between a location downstream from the heater and a first reference location, and at least one second thermocouple for generating a second signal proportional to a temperature difference between a location upstream from the heater and a second reference location which second reference location is different from the first reference location. At least one third thermocouple is provided for generating a third signal proportional to a temperature difference between the first reference location and the second reference location. Finally, a sensing signal indicative of the flow of the fluid over the heater and the first and the second thermocouple is calculated dependent on the first signal, the second signal and the third signal.

The measured thermoelectric voltage difference represented by the sensing signal is intentionally related to a temperature difference between the locations up- and downstream of the heater caused by the fluid flow. The locations up- and downstream of the heater as well as the heater itself are preferably arranged on a membrane which may be built by thinning the substrate, and in particular by thinning a bulk material of the substrate at the defined location. Preferably, the substrate comprises at least the bulk material such as silicon, and preferably in addition layers deposited thereon, such as CMOS layers. A recess may be formed in the bulk material from its back side, i.e. the side opposite from a front side the layers are arranged on. The membrane may exclusively be built from one or more of the layers in case the bulk material is completely removed in the area of the membrane, or may be built from one or more of the layers and a portion of the bulk material in case the bulk material is thinned in the region of the membrane but not completely removed. In a different embodiment, the recess is not built from the back side but from the front side of the bulk material prior to applying the layers such that by applying the layers a cavity is built between the layers forming the membrane and the bulk material.

Hence, hot junctions of the first and the second thermocouple are placed down- and upstream of the heater on the membrane. In this context, the membrane defines an area of the substrate, also referred to as measuring region, with a thermal conductance lower than in the rest of the substrate where the bulk material is not thinned, and which region is also referred to as regular region. Terminals of the first thermocouple, or corresponding cold junctions/other junctions, are therefore preferably arranged in the regular region, i.e. outside the membrane, at a location referred to as first reference location. The same holds for terminals or corresponding cold junctions/other junctions of the second thermocouple which are preferably placed in the regular region at a second reference location, which, however, is understood to be spaced apart from the first reference location, e.g. by the membrane.

However, in a different embodiment, all junctions of the first, second and third thermocouple may completely be arranged on the membrane, e.g. in case the membrane itself provides areas of different thermal conductance.

It was now found that the thermoelectric voltage difference of the first and the second thermocouple may also—unintentionally—be related to a temperature difference between the first and the second reference location. There may be a number of factors influencing the temperatures at the first and the second reference location inhomogeneously and consequently may have an undesirable effect on the thermoelectric voltage difference:

Production related membrane asymmetries are often characterized on wafer level. This offset calibration process, which potentially takes into account a temperature dependence of the membrane asymmetry, is very important to achieve a high accuracy of the final flow sensor arrangement. But for the final application diced sensor chips mounted on a PCB or a lead frame, etc. may individually be assembled in a flow-housing. Surrounding thermal sources and sinks may change significantly by a transition from the flow sensor chip embedded in a wafer composite to the diced and individually assembled flow sensor chips. Thereby, a temperature difference between the thermocouple cold junctions might also change. And therefore, an accurate calibration may require the determination and correction of such changing thermal differences between the cold junctions.

The activity of energy dissipating elements integrated in the bulk material surrounding the membrane, such as an electrical circuitry measuring and processing the voltage difference signal, may also affect the temperature difference between the cold junctions, which is the case for diced flow sensor chips as well as for flow sensor chips in the wafer composite.

Hence, presently a flow sensor arrangement is proposed, in which a temperature difference between the first and the second reference locations is measured by at least one third thermocouple to achieve an improved calibration accuracy for the measured thermoelectric voltage difference signal. In brief, it is proposed to integrate a third thermocouple in or on the substrate with the respective two junctions in close proximity to the cold junctions of the up- and downstream thermocouples. A signal stemming from this third thermocouple is used for compensating the sensing signal for temperature differences between these two reference locations.

Each of the first, second and third thermocouple preferably comprises one of:
- a junction connecting two metal elements of a different material;
- a junction connecting two polysilicon elements of different doping, and preferably wherein one of the polysilicon elements comprises an n+ doping while the other polysilicon element comprises a p+ doping;
- a junction connecting a metal element and a polysilicon element, e.g. of n+ or p+ doping.

Preferably, each of the first, second and third thermocouple comprises the same material composition. In the case of thermopiles comprising multiple thermocouples, it is preferred that all thermocouples are made from the same material composition.

Preferably, the heater comprises one of a metal element and a polysilicon element, e.g. of n+ or p+ doping. Preferably, the heater is made from the same material composition as are the thermocouples, i.e. the heater is made from metal in case both of the thermocouple elements are made from metal, or is made from polysilicon in case both of the thermocouple elements are made from polysilicon. Preferably, for both, the heater and a thermocouple, in case of a metal element, the metal element is formed in a metal layer of a stack of layers, such as CMOS layers arranged a bulk material of the substrate. Preferably, in case of a polysilicon element, the polysilicon element is formed in a polysilicon layer of the stack of layers. Hence, it is preferred that the heater and the thermocouples are made compatible to CMOS processing.

According to a further aspect of the present invention, a method is provided for determining the flow of a fluid. A substrate is provided with a heater, at least one first thermocouple, at least one second thermocouple, and at least one third thermocouple arranged therein or thereon. By the at least one first thermocouple a first signal is measured proportional to a temperature difference between a location downstream from the heater and a first reference location. A second signal proportional to a temperature difference between a location upstream from the heater and a second reference location which second reference location is different from the first reference location is measured by the at least one second thermocouple. A third signal proportional to a temperature difference between the first reference location and the second reference location is measured by the at least one third thermocouple. The flow of the fluid over the heater and the first and the second thermocouple, at least their hot junctions, is determined dependent on the first signal, the second signal and the third signal.

Further advantageous embodiments are illustrated in more detail in the dependent claims.

BRIEF DESCRIPTION OF THE DRAWINGS

Further advantages and advantageous embodiments are illustrated in more detail in the following description. This description makes reference to the attached figures, which illustrate:

FIG. 2 a top view on a flow sensor arrangement according to another preferred embodiment of the present invention;

FIG. 3 a schematic sectional view of the flow sensor arrangement along line II-II of FIG. 2.

DETAILED DESCRIPTION OF THE DRAWINGS

Figure 1:
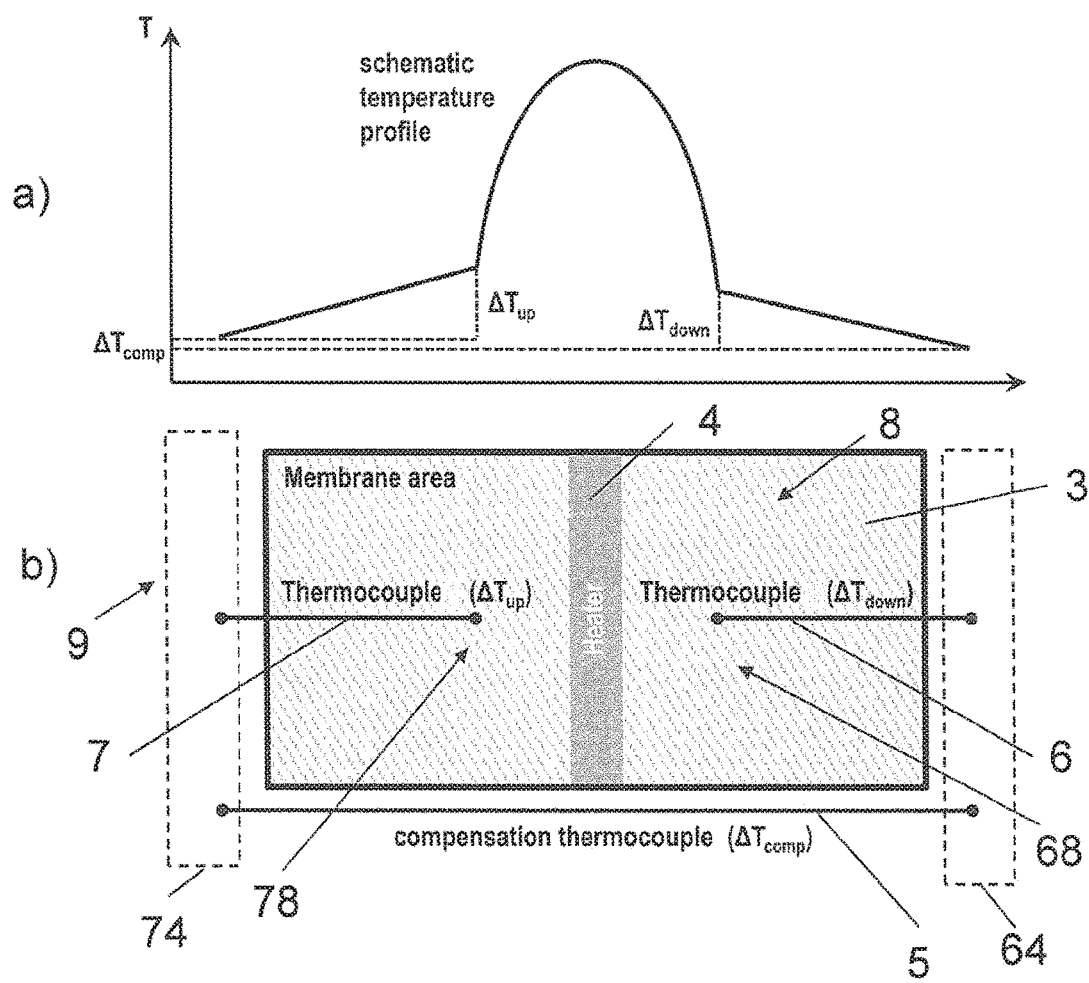
FIG. 1 a top view on a section of a flow sensor arrangement according to a preferred embodiment of the present invention in diagram b) and a corresponding temperature profile in diagram a)

A thermocouple generally represents two elements made from different electrically conducting materials. The elements are joined resulting in a hot junction, which is a measuring junction and as such resides at a location a temperature of which location is to be measured. The other junction of the elements or the junctions of the element terminals to connectors is referred to as cold junction which acts as a reference junction.

FIG. 1b) illustrates a schematic top view on a portion of a flow sensor chip according to an embodiment of the present invention, and specifically on a portion of a substrate 1 of the flow sensor chip that is thinned from its backside and therefore can be considered as a membrane 3. The portion outside the membrane 3 represents a non-thinned portion of the substrate. Owed to this structure, the membrane 3 represents a measurement region 8 of the substrate with a low thermal conductivity which is achieved by the recess. In contrast, the region outside the membrane 3 is referred to as regular region 9 with a thermal conductivity that typically exceeds the thermal conductivity of the membrane 3.

The basic sensor elements are all at least partly arranged on the substrate, i.e. a heater 4, a first thermocouple 6, a second thermocouple 7 as well as a third thermocouple 5 extending along the membrane 3. Under the assumption that the fluid flows from left to right in FIG. 1b), reference 68 refers to a location downstream of the heater 4, reference 78 refers to a location upstream of the heater 4, both of which locations 68 and 78 are on the membrane 3. A first reference location 64 is located outside the membrane 3 on the substrate downstream of the heater 4, while a second reference location 74 is located outside the membrane 3 on the substrate 1 upstream of the heater 4. Hence the first thermocouple 6 extends between the downstream location 68 and the first reference location 64, the second thermocouple 7 extends between the upstream location 78 and the second reference location 74, and the third thermocouple 5 extends between the first reference location 64 and the second reference location 74, in the present example outside the membrane 3.

FIG. 1a) illustrates a temperature profile corresponding to the section of the flow sensor arrangement shown in FIG. 1b) and denotes temperature differences measured by the individual thermocouples 5, 6 and 7. In this example, the temperatures at both sides of the heater 4 serving as reference temperatures for the first and the second thermocouple 6, 7 are slightly different from each other.

For further reference, the following variables are used:

$T_{comp\ down}$: Temperature of the substrate 1 at the first reference location 64, i.e. on the downstream side;

$T_{comp\ up}$: Temperature of the substrate 1 at the second reference location 74, i.e. on the upstream side;

$T_{membrane\ down}$: Temperature of the membrane 3 at the downstream location 68, $T_{membrane\ up}$: Temperature of the membrane 3 at the upstream location 78.

Hence, it follows that the first thermocouple 6 measures the following first signal $\Delta T_{down}$:

$$\Delta T_{down} = T_{membrane\ down} - T_{comp\ down}$$

The second thermocouple 7 measures the following second signal $\Delta T_{up}$:

$$\Delta T_{up} = T_{membrane\ up} - T_{comp\ up}$$

And the third thermocouple 5 measures the following third signal $\Delta T_{comp}$:

$$\Delta T_{comp} = T_{comp\ up} - T_{comp\ down}$$

Finally, means not shown in FIG. 1 are provided for determining a sensing signal. $\Delta T$ which is indicative of the flow of the fluid passing the structure as illustrated in FIG. 1b):

$$\Delta T = \Delta T_{down} - \Delta T_{up} - \Delta T_{comp}$$

Of course, in case there is no difference in bulk temperatures $T_{comp\ up} = T_{comp\ down}$ there is no compensation required and $T_{comp}$ contributes by the value zero to the sensing signal $\Delta T$.

FIG. 2 illustrates a flow sensor arrangement in a top view according to another embodiment of the present invention. FIG. 3 illustrates the corresponding cut along II-II in FIG. 2.

Both, the arrangement of FIGS. 1 and 2 are preferably designed as a semiconductor chip based on a silicon substrate 1, even though another semiconductor or dielectric substrate could be used as well, such as a glass substrate. It is understood, that the term substrate 1 comprises bulk material 11 as well as layers 12 deposited thereon, such as CMOS layers. A recess or opening 2 is formed in the substrate 1, e.g. by etching techniques, such that a membrane 3 is generated in the substrate 1 that extends over the recess 2.

In FIGS. 2 and 3, a heater 4 extends over the membrane 3 which heater 4 is formed by three parallel conductors 4a, 4b, 4c, the two outer conductors 4a, 4c being arranged, electrically, in parallel, while the center conductor 4b (having double cross section) is in series to the conductors 4a, 4c.

A first thermopile TP6 comprises a plurality of first thermocouples 6 in series and is arranged downstream of the heater 4. A second thermopile TP7 comprises a plurality of second thermocouples 7 in series and is arranged upstream of the heater 4. The terms "upstream" and "downstream" are defined with respect to a flow direction F perpendicular to a longitudinal axis of the heater 4. Each thermocouple TP6, TP7 comprises a metal element 61, 71 (shown in continuous lines in FIG. 2) formed in a metal layer of the stack of layers 12 as well as a polysilicon element 62, 72 (shown in dotted lines in FIG. 2) formed in a polysilicon layer of the stack of layers 12. The metal and polysilicon elements 61, 71 and 62, 72 of each thermocouple TP6, TP7 are interconnected at junctions 63, 73 on the membrane 3. The polysilicon and metal elements 62, 72 and 61, 71 of two neighboring thermocouples 6, 7 are interconnected at other junctions 69, 79 which other junctions 10 are not located on the membrane 3, but over the bulk material 11 of the substrate 1. In particular, the other junctions 69 of the first thermopile TP6 define a first reference location 64 while the other junctions 79 of the second thermopile TP7 define a second reference location 74, wherein the second reference location 74 is separated from the first reference location 64 by the membrane 3, which is also true for the embodiment of FIG. 1.

In addition, a third thermocouple 5 is provided comprising a junction 53 at the first reference location 64 and terminals 51, 52 at the second reference location 74. The third thermocouple 5 extends between these reference locations 64 and 74 and thereby passes the membrane 3. Preferably, the third thermocouple 5 comprises of a metal element and a polysilicon element. A third thermopile TP5, comprising multiple third thermocouples 5, may be used instead of one third thermocouple; the third thermopile is indicated positionally in FIG. 2 in the same manner as TP6 and TP7, but for simplicity of illustration is represented in the drawing by a single third thermocouple 5.

In an alternate embodiment, all of the first, second and third thermopiles comprise elements of two different metals, or alternatively. In a further variant one of the elements is of n+ polysilicon and the other element is of p+ polysilicon.

A flow of a fluid along flow direction F causes a distribution of heat from the heater 4 to become more asymmetric, which creates a difference of temperatures at the junctions 63 and 73 of the two thermopiles TP6, TP7. At the same time, the other junctions 69 of the first thermopile TP6 remain at a temperature of the bulk material 11 at the first reference location 64 while the other junctions 79 of the second thermopile TP7 remain at a temperature of the bulk material 11 at the second reference location 74 the temperatures of which reference locations 64, 74 may differ from each other as explained above in more detail.

Hence, a difference of voltages from the thermopiles TP6 and TP7 (or any value proportional thereto) and the third thermocouple 5 substantially represents a sensing signal $\Delta T$ of the temperature difference at the first junctions 79 and 69 upstream and downstream of the heater 4 compensated by a temperature difference between the first and the second reference location 64 and 74. This sensing signal $\Delta T$ is a measure for the mass flow of the fluid.

Generally, it is preferred that an A/D-converter is provided for digitizing the sensing signal $\Delta T$ or yet the first, the second and the third signal. Generally, means are provided for determining the sensing signal $\Delta T$, which means are either embodied as hardware, as firmware or as software. Hence, in a preferred embodiment, the subject calculation can be implemented hardwired, or by a processor, for example. Preferably, a heater control 17 is provided for controlling a current through the heater 4, and a processing unit for processing the digitized sensing signal $\Delta T$, possibly including a look-up table for converting the sensing signal $\Delta T$ into a flow. Advantageously, the circuitry for all these elements is integrated in the substrate 1, but it can also be formed at least in part by external components.

The embodiments shown so far comprise two thermocouples arranged upstream and downstream from the heater. It is noted, though, that a single thermocouple can be used, which is e.g. located downstream from the heater, in case the device is designed to measure a flow in one direction only, or which extends between junctions upstream and downstream of the heater.

It is noted that in the embodiments described above, each thermocouple used in the various thermopiles or alone comprises two conductors of a different material. Advantageously, the same materials are used for all thermocouples in order to profit from common aging properties. Advantageously, one of the materials is a polysilicon while the other material is a metal, such as aluminum. In addition, all conductors of the thermocouples are preferably manufactured from the same two layers deposited on the substrate, e.g. one being a polysilicon layer and the other one being a metal layer.

Figure 4:
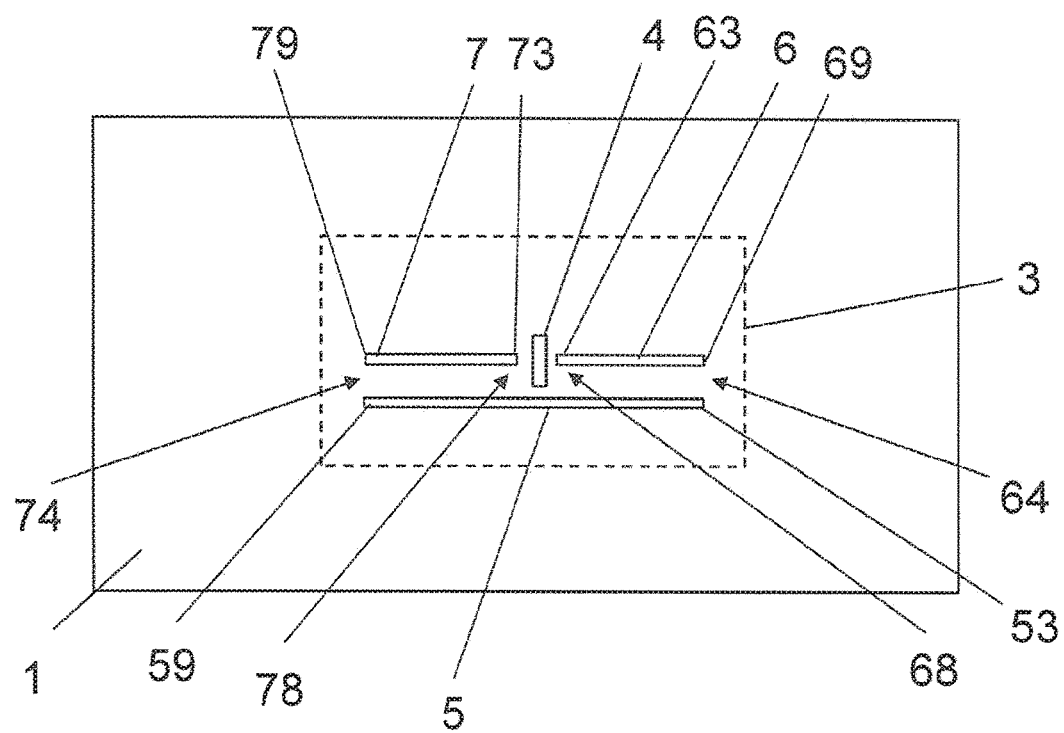
FIG. 4 a top view on a flow sensor arrangement according to another embodiment of the present invention.

FIG. 4 illustrates a schematic top view on a flow sensor chip according to an embodiment of the present invention. A substrate 1 of the flow sensor chip includes a portion that is thinned from its backside and therefore can be considered as a membrane 3, indicated by dashed lines in view of the top view on the flow sensor chip. The portion outside the membrane 3 represents a non-thinned portion of the substrate 1. In this embodiment, the following sensor elements are all arranged on or in the membrane 3: A heater 4, a first thermocouple 6, a second thermocouple 7 as well as a third thermocouple 5. Under the assumption that the fluid flows from left to right, reference 68 refers to a location downstream of the heater 4, reference 78 refers to a location upstream of the heater 4, both of which locations 68 and 78 are on the membrane 3. A first reference location 64 is located on membrane 3 downstream of the heater 4, while a second reference location 74 is located on the membrane 3 upstream of the heater 4. Hence the first thermocouple 6 extends between the downstream location 68 and the first reference location 64, the second thermocouple 7 extends between the upstream location 78 and the second reference location 74, and the third thermocouple 5 extends between the first reference location 64 and the second reference location 74, in the present example all on the membrane 3.

In this example, the regions of different thermal conductivity are all arranged on the membrane 3, wherein the measurement region 8 is at hot junctions 63, 73 of the first and second thermocouple 6, 7 respectively, while the reference locations 64 and 74 are at cold junctions 69, 79 of the first and second thermocouple 6, 7 respectively, away from the heater 4. The third thermocouple 5 has a hot junction 53 and a cold junction 59 which can also be alternated.

First, second and third thermopiles can be used instead of the first, second and third thermocouple 6, 7, 5.

The invention claimed is:

1. Flow sensor arrangement for determining the flow of a fluid, comprising a substrate, and arranged therein or thereon: —a heater, —at least one first thermocouple for generating a first signal proportional to a temperature difference between a location downstream from the heater and a first reference location, wherein the first thermocouple comprises a hot junction arranged at the location downstream from the heater and a cold junction arranged at the first reference location, at least one second thermocouple for generating a second signal proportional to a temperature difference between a location upstream from the heater and a second reference location which second reference location is different from the first reference location, wherein the second thermocouple comprises a hot junction at the location upstream from the heater and a cold junction arranged at the second reference location, —at least one third thermocouple for generating a third signal proportional to a temperature difference between the first reference location and the second reference location, a processor for determining a sensing signal indicative of the flow of the fluid over the heater and the first and the second thermocouple dependent on the first signal, the second signal and the third signal.

2. The flow sensor arrangement according to claim 1, wherein the processor is adapted to determine a difference between the first and the second signal and to adjust the difference by subtracting the third signal therefrom for compensating for different temperatures at the first and the second reference location.

3. The flow sensor arrangement according to claim 1, wherein the processor is adapted to subtract the second signal and the third signal from the first signal.

4. The flow sensor arrangement according to claim 1, comprising a first thermopile with multiple first thermocouples comprising hot junctions arranged at the location downstream from the heater and cold junctions arranged at the first reference location by connecting terminals of adjacent first thermocouples, and comprising a second thermopile with multiple second thermocouples comprising hot junctions arranged at the location upstream from the heater and cold junctions arranged at the second reference location by connecting terminals of adjacent second thermocouples.

5. The flow sensor arrangement according to claim 1, wherein the third thermocouple comprises a hot junction arranged at the first reference location and a cold junction arranged at the second reference location, or wherein the third thermocouple comprises a hot junction arranged at the second reference location and a cold junction arranged at the first reference location.

6. The flow sensor arrangement according to claim 5, comprising a third thermopile with multiple third thermocouples comprising hot junctions arranged at one of the first reference location and the second reference location and cold junctions arranged at the second reference location or first reference location respectively by connecting terminals of adjacent third thermocouples.

7. The flow sensor arrangement of claim 5, wherein each of the hot and cold junction of the third thermocouple is arranged in close proximity to the assigned cold junction of the first or second thermocouple respectively.

8. The flow sensor arrangement of claim 1, comprising a recess in the substrate thereby defining a membrane extending over the recess, wherein all junctions of the first, second and third thermocouple are arranged on the membrane.

9. The flow sensor arrangement according to claim 1, wherein the processor is integrated into the substrate, and preferably wherein the determination means processing unit is hardwired logic.

10. The flow sensor arrangement according to claim 1, wherein each of the first, second and third thermocouple comprises one of:
a hot junction connecting two metal elements of different material;
a hot junction connecting two polysilicon elements of different doping, and preferably wherein one of the polysilicon elements comprises an n+ doping while the other polysilicon element comprises a p+ doping;
a hot junction connecting a metal element and a polysilicon element;
and preferably wherein all the first, second and third thermocouples comprise the same material composition.

11. The flow sensor arrangement according to claim 1, wherein the heater comprises one of a metal element and a polysilicon element,
and preferably wherein the heater comprises a metal element in case both of the elements of at least one of the first, second or third thermocouple comprises metal, or comprises polysilicon in case both of the elements of at least one of the first, second or third thermocouple comprises polysilicon.

12. The flow sensor arrangement according to claim 1, wherein all of the heater and the first, second and third thermocouple are formed of one or more metal layers or polysilicon layers of a stack of CMOS layers arranged on a bulk material of the substrate.

13. Flow sensor arrangement for determining the flow of a fluid, comprising a substrate, and arranged therein or thereon: —a heater, —at least one first thermocouple for generating a first signal proportional to a temperature difference between a location downstream from the heater and a first reference location, at least one second thermocouple for generating a second signal proportional to a temperature difference between a location upstream from the heater and a second reference location which second reference location is different from the first reference location, —at least one third thermocouple for generating a third signal proportional to a temperature difference between the first reference location and the second reference location, a processor for determining a sensing signal indicative of the flow of the fluid over the heater and the first and the second thermocouple dependent on the first signal, the second signal and the third signal, wherein the substrate comprises a measuring region and a regular region, wherein a thermal conductance in the measuring region is lower than a thermal conductance in the regular region, and wherein the heater, the downstream location and the upstream location are arranged in the measuring region while the first reference location and the second reference location are arranged in the regular region.

14. The flow sensor arrangement according to claim 13, comprising a recess in the substrate thereby defining a membrane extending over the recess respectively, wherein the measuring region is defined by the membrane and the regular region is defined outside the measuring region.

15. The flow sensor arrangement according to claim 13, wherein the first thermocouple comprises a hot junction arranged at the location downstream from the heater and a cold junction arranged at the first reference location, wherein the second thermocouple comprises a hot junction at the location upstream from the heater and a cold junction arranged at the second reference location, wherein the hot junction of the first thermocouple and the hot junction of the second thermocouple is arranged in the measuring region while the cold junction of the first thermocouple and the cold junction of the second thermocouple is arranged in the regular region.

16. The flow sensor arrangement according to claim 13, wherein the third thermocouple comprises a hot junction arranged at the first reference location and a cold junction arranged at the second reference location, or wherein the third thermocouple comprises a hot junction arranged at the second reference location and a cold junction arranged at the first reference location, and wherein the hot junction and the cold junction of the third thermocouple are arranged in the regular region.

17. The flow sensor arrangement according to claim 13, wherein the one or more third thermocouples extend from the regular region over the measurement region into the regular region.

18. The flow sensor arrangement according to claim 13, wherein the one or more third thermocouples exclusively extend over the regular region.

19. Method for determining the flow of a fluid, comprising
providing a substrate with a heater, at least one first thermocouple, at least one second thermocouple, and at least one third thermocouple arranged therein or thereon,
measuring by the at least one first thermocouple a first signal proportional to a temperature difference between a location downstream from the heater and a first reference location,
measuring by the at least one second thermocouple a second signal proportional to a temperature difference between a location upstream from the heater and a second reference location which second reference location is different from the first reference location,
measuring by the at least one third thermocouple a third signal proportional to a temperature difference between the first reference location and the second reference location, and
determining the flow of the fluid over the heater and the first and the second thermocouple dependent on the first signal, the second signal and the third signal.

20. Method according to claim 19, which steps are performed during a calibration routine of a flow sensor arrangement comprising the substrate, the heater and the first, second and third thermocouple.

* * * * *